(12) United States Patent
Shin et al.

(10) Patent No.: US 11,301,667 B2
(45) Date of Patent: Apr. 12, 2022

(54) SMART USER EQUIPMENT CONNECTED TO HEAD MOUNTED DISPLAY AND METHOD OF CONTROLLING THE SAME

(71) Applicants: ALPHACIRCLE CO., LTD, Seongnam-si (KR); SUWON UNIVERSITY-INDUSTRY COLLABORATION & CONSULTING FOUNDATION, Hwaseong-si (KR)

(72) Inventors: Eui Hyun Shin, Seongnam-si (KR); Ta Sik Chung, Seongnam-si (KR); Dong Woo Cha, Seongnam-si (KR)

( * ) Notice: Subject to any disclaimer, the term of this patent is extended or adjusted under 35 U.S.C. 154(b) by 0 days.

(21) Appl. No.: 17/288,136

(22) PCT Filed: Oct. 24, 2019

(86) PCT No.: PCT/KR2019/014085
§ 371 (c)(1),
(2) Date: Apr. 23, 2021

(87) PCT Pub. No.: WO2020/085821
PCT Pub. Date: Apr. 30, 2020

(65) Prior Publication Data
US 2021/0312160 A1    Oct. 7, 2021

(30) Foreign Application Priority Data
Oct. 24, 2018   (KR) ........................ 10-2018-0127250

(51) Int. Cl.
*G06K 9/00*    (2006.01)
*G06F 3/01*    (2006.01)
(Continued)

(52) U.S. Cl.
CPC .......... *G06K 9/00201* (2013.01); *G06F 3/011* (2013.01); *G06F 3/017* (2013.01); *G06F 3/0482* (2013.01); *G06F 3/0487* (2013.01)

(58) Field of Classification Search
CPC ......... H04N 13/271; H04N 2013/0081; H04N 5/64; H04N 13/243; H04N 5/2253;
(Continued)

(56) References Cited

U.S. PATENT DOCUMENTS

2016/0313790 A1* 10/2016 Clement ............ G02B 27/0093
2017/0287301 A1* 10/2017 Taylor ..................... G01S 15/93
2018/0285636 A1* 10/2018 Fei ..................... G06K 9/00375

FOREIGN PATENT DOCUMENTS

KR    10-2011-0070331 A    6/2011
KR    10-2015-0104769 A    9/2015
(Continued)

OTHER PUBLICATIONS

International Search Report for PCT/KR2019/014085 dated Feb. 19, 2020.
(Continued)

*Primary Examiner* — Samira Monshi
(74) *Attorney, Agent, or Firm* — Quantum Patent Law Firm

(57) ABSTRACT

A smart user equipment (UE) connected to a head mounted display (HMD) worn on a user's head, for playing a video is disclosed. The smart UE includes an operation control module configured to recognize a predetermined user action by a sensor or a camera included in the smart UE and perform a control operation mapped to the user action. The smart UE enables the user to control an operation of the smart UE regardless of whether the HMD includes a separate control means by controlling the smart UE without removing the HMD through the operation control module.

(Continued)

While the user is viewing video content including virtual reality, wearing the HMD, the smart UE autonomously detects a dangerous situation through situation awareness and notifies the user of the dangerous situation by an operation of recognizing an obstacle appearing in front of the user by using a rear camera which is installed at the rear of the smart UE and monitors the front of the user, and upon recognition of the obstacle, displaying a front view screen on a display unit included in the smart UE in real time, to enable the user to identify and cope with the dangerous situation without removing the HMD. When the distance between the user and the obstacle is equal to or less than a threshold, the smart UE discontinues the video play and displays only the front view screen.

7 Claims, 4 Drawing Sheets

(51) Int. Cl.
*G06F 3/0482* (2013.01)
*G06F 3/0487* (2013.01)

(58) Field of Classification Search
CPC .. H04N 5/2257; H04N 13/204; H04N 13/239; H04N 13/25; H04N 13/332; H04N 5/33; H04N 7/142; H04N 7/144; H04N 13/128; H04N 13/254; H04N 13/275
See application file for complete search history.

(56) References Cited

FOREIGN PATENT DOCUMENTS

| | | |
|---|---|---|
| KR | 10-1839441 B1 | 3/2016 |
| KR | 10-2017-0089228 A | 8/2017 |
| KR | 10-2017-0099755 A | 9/2017 |

OTHER PUBLICATIONS

Korean Office Action (Decision of Refusal) dated Jan. 4, 2021 for KR Application No. 10-2018-0127250 (with English Translation).

* cited by examiner

SMART USER EQUIPMENT CONNECTED TO HEAD MOUNTED DISPLAY AND METHOD OF CONTROLLING THE SAME

CROSS-REFERENCE TO RELATED APPLICATIONS

This patent application is the U.S. National Stage Application of International Application No. PCT/KR2019/014085, filed Oct. 24, 2019 and the entire contents of which are incorporated herein by reference, which claims priority to Korean Application No. 10-2018-0127250, filed Oct. 24, 2018 and the entire contents of which are incorporated herein by reference.

TECHNICAL FIELD

The present invention relates to a smart user equipment (UE), and more particularly, to a smart UE connected to a head mounted display (HMD) and a method of controlling the same.

BACKGROUND ART

A head mounted display (HMD) is a display device worn on a user's head. Since the HMD adopts stereoscopic technology, it gives a three-dimensional (3D) effect and has a wide viewing angle, thus increasing a sense of presence and immersion. Therefore, the HMD is used for realization of virtual reality (VR) or augmented reality (AR).

However, because the HMD is worn on the head, covering the eyes, the user may not directly see the surroundings, which may cause a safety problem. Particularly, an HMD used with a device such as a smartphone mounted thereon without any separate control means should be worn and removed inconveniently, for manipulation such as stopping video play.

Accordingly, the inventor of the present invention has devised the present invention after long research and trial and error to solve the problem.

DISCLOSURE

Technical Problem

Therefore, the present invention has been made in view of the above problems, and it is an object of the present invention to provide a smart user equipment (UE) connected to a head mounted display (HMD) and a method of controlling the same.

Advantageous Effects

According to an embodiment of the present invention, a smart user equipment (UE) connected to a head mounted display (HMD) may be controlled efficiently.

BEST MODE

In the description of the present invention, lest it should obscure the subject matter of the present invention, a detailed description of a well-known function obvious to those skilled in the art will be avoided herein.

Figure 1:
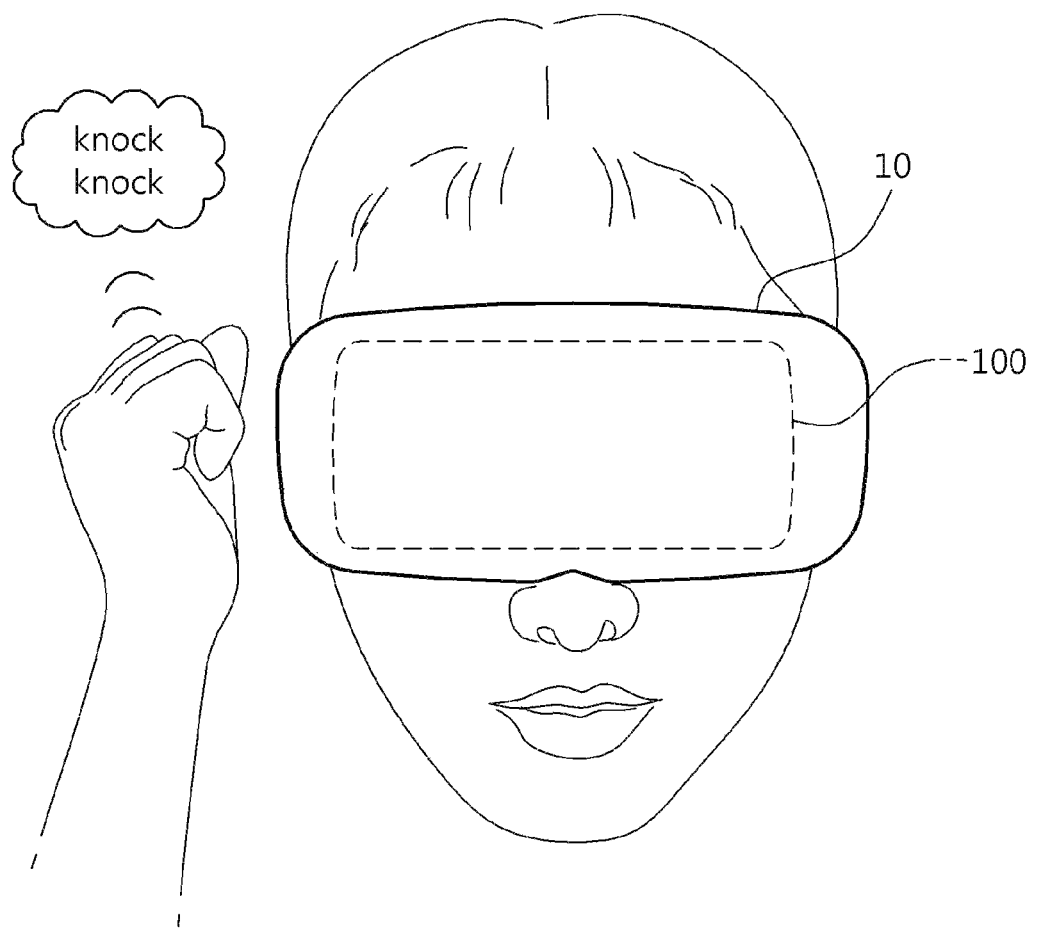
FIG. 1 is a schematic diagram illustrating control of a smart user equipment (UE) without removing a head mounted display (HMD) according to the present invention.

FIG. 1 is a schematic diagram illustrating control of a smart user equipment (UE) without removing a head mounted display (HMD) according to the present invention.

While an HMD 10 is described as having no display, that is, a method of reproducing an image on a display of a smart UE 100 connected to the HMD 10 is described in a preferred embodiment of the present invention, the present invention is not limited thereto. For example, the present invention is also applicable to the HMD 10 with a display. This is because the same operation may be performed, as far as the configuration of a smart UE described below is included in the HMD.

As illustrated in FIG. 1, a user is viewing video content including virtual reality (VR), wearing the HMD 10. During the viewing, the user may control the HMD 10, for example, by tapping the HMD 10. With this control operation, the HMD 10 may be immediately controlled even without a separate control means. Further, the immediate control is possible without removing the HMD 10 and then touching the smart UE. That is, the HMD 10 may be controlled regardless of whether the HMD 10 is equipped with a separate control means and whether the smart UE is used as a display means in connection to the HMD 10.

In another embodiment, the smart UE may detect a dangerous situation through situation awareness and notify the user of the dangerous situation, while the user is viewing video content including VR, wearing the HMD 10. In a preferred embodiment, the smart UE 100 notifies a dangerous situation by recognizing an obstacle in front of the user using a rear camera installed at the rear of the smart UE to monitor the user's front and displaying what is ahead of the user in real time on the display of the smart UE.

When a dangerous situation is notified to the user, the user may determine how serious the dangerous situation is and accordingly cope with the dangerous situation by taking off the HMD 10 or taking any other action.

Although a basic action for coping with the dangerous situation may be removal of the HMD 10, the present invention enables the user to cope with the dangerous situation without removing the HMD 10. For example, the user may immediately perform various control operations by tapping the HMD 10. For example, when someone suddenly opens the door and delivers a product to the user, what is in front of the user is displayed on the smart UE. Because the user may be aware that the sudden situation is not a dangerous situation, the user does not need to take off the HMD 10. In this case, the user pauses video play by tapping the HMD 10, and then receives the object and puts it at a desired location, while wearing the HMD 10. Then, the user may resume playing the video by tapping the HMD 10.

While not shown, the HMD 10 of the present invention is a device including an external case, a support means for fixing the external case to the head, a display unit (for example, the smart UE), and a frame supporting the display unit. In addition, although the HMD 10 of the present invention does not include a separate control means such as a form held in a hand, the present invention is also applicable even when the control means is included.

Figure 2:
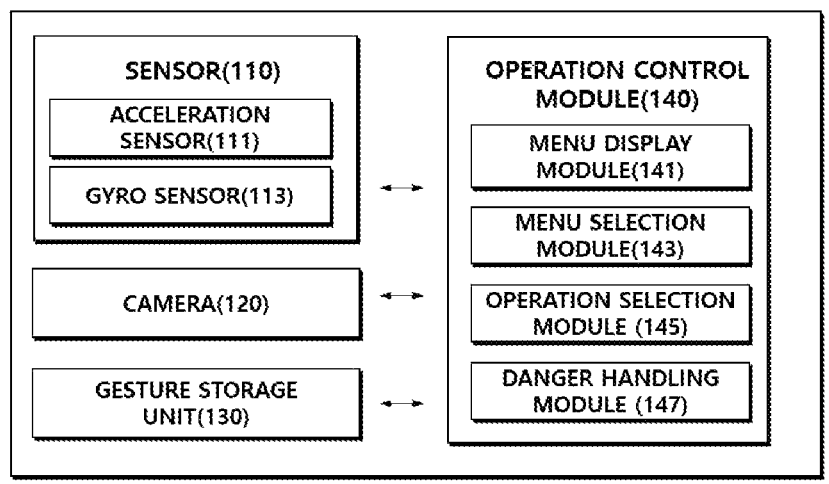
FIG. 2 is a block diagram illustrating a preferred embodiment of a smart UE according to the present invention.

FIG. 2 is a block diagram illustrating a preferred embodiment of a smart UE according to the present invention.

Referring to FIG. 2, the smart UE 100 of the present invention may include a sensor 110, a camera 120, a gesture storage unit 130, and an operation control module 140.

The sensor 110 includes a plurality of sensors in the smart UE. For example, the sensor 110 may include an acceleration sensor 111 and a gyro sensor 113. The acceleration sensor 111 is a sensor that measures the acceleration of movement of a smartphone in X, Y, and Z coordinates. The gyro sensor 113 is a sensor that measures an angular velocity. The smart UE of the present invention may detect a predetermined user action, for example, an action of tapping the HMD by the sensor 110 such as the acceleration sensor 111 and the gyro sensor 113.

The camera 120 is a device embedded in the smart UE to capture an image, which may be a rear camera mounted on a surface opposite to the display screen of the smart UE. The rear camera may capture a user's hand motion in front of the HMD. To this end, the external case of the HMD may be open in a part with the rear camera or may be semi-transparent so that the rear camera may capture the user's hand motion.

The gesture storage unit 130 may store types of user hand motions and types of control operations mapped to the hand motion types.

The operation control module 140 recognizes a predetermined user action using the sensor 110 or the camera 120 included in the smart UE, and performs a control operation mapped to the user action. As such, the smart UE 100 of the present invention uses the operation control module 140 to allow the user to control the smart UE without taking off the HMD. Thus, regardless of whether a separate control means is included in the HMD, the operation of the smart UE is controlled.

Various embodiments may be implemented regarding a user action that the operation control module 140 recognizes. In a preferred embodiment, the operation control module 140 may perform a control operation by recognizing a user action of tapping the HMD by using a sensor included in the smart UE. The tap action may further be specified by the number of times. For example, because one tap may be erroneously recognized, a double tap may be recognized as one action. A plurality of control operations may be mapped to one action. For example, when a double tap is recognized during video play, the video play may be stopped (paused), and when a double tap occurs during the pause, the play may be resumed. In this manner, when one action (e.g., a double tap) enables control of all control operations, the user may easily remember the action and easily control the HDM.

In another embodiment, different control operations may be performed according to different numbers of taps. Further, a different control operation may be performed by adjusting a tap interval.

The control operation may include at least one of video play, play pause, and display of what is ahead of a user. Displaying the front is meaningful in that the user is allowed to identify what is ahead of the user without taking off the HMD by displaying an image captured by the rear camera on the display screen. The front display may be a full-screen or partial-screen display.

In another embodiment, the operation control module 140 may include a menu display module 141, a menu selection module 143, an operation selection module 145, and a danger handling module 147.

Upon recognition of a user's tap action, the menu display module 141 pops up a selection menu for controlling the smart UE on the display of the smart UE. In the selection menu, a plurality of menus such as video play, pause, back, and play speed control may be displayed overlapped. Further, the menu display module 141 may visualize a menu selection pointer that may move on the selection menu according to the movement of the user's head.

The menu selection module 143 detects the movement of the user's head using the sensor of the smart UE, and moves the menu selection pointer on the selection menu according to the movement of the head. That is, when the head rotates, the menu selection pointer moves on the selection menu.

When the user's tap action is recognized, the operation selection module 145 performs an operation displayed in an area where the menu selection pointer is located.

The danger handling module 147 may recognize a dangerous situation occurring in front of the user by the camera included in the smart UE, and perform a control operation mapped to the dangerous situation. As such, the smart UE of the present invention may enable the user to control the smart UE without taking off the HMD by using the danger handling module 147, so that the user may identify and cope with a dangerous situation.

In a preferred embodiment, the danger handling module 147 may recognize an obstacle appearing in front of the user by the rear camera installed at the rear of the smart UE to monitor what is in front of the user, and when recognizing the obstacle in front of the user, display a front view screen in real time on the display unit included in the smart UE.

Various embodiments may be implemented for a method of displaying what is in front of the user by the danger handling module 147. In one embodiment, when the distance between the user and an obstacle is larger than a predetermined threshold, the danger handling module 147 may simultaneously display a playback screen and a front view screen, whereas when the distance is less than the threshold, the danger handling module 147 may display only the front view screen, while stopping the play screen. As such, inconvenience that the user feels may be reduced by changing a display method according to how serious the dangerous situation. In another embodiment, the danger handling module 147 may display a front view screen in a direction in which an obstacle appears among the top, bottom, left, and right directions of the display unit. As the direction in which the obstacle appears is displayed from the beginning of displaying the front view screen, the user may more actively cope with the dangerous situation. For example, the user may take an action of avoiding the obstacle without taking off the HMD.

In another embodiment, the operation control module 140 may use a camera module to recognize a hand motion that the user makes in front of the HMD, and control the smart UE according to a control operation mapped to the type of the hand motion stored in the gesture storage unit 130. For example, when the user clenches his or her fist, video content play may be paused, and when the palm of the hand is opened, the video content may be played again.

Figure 3:
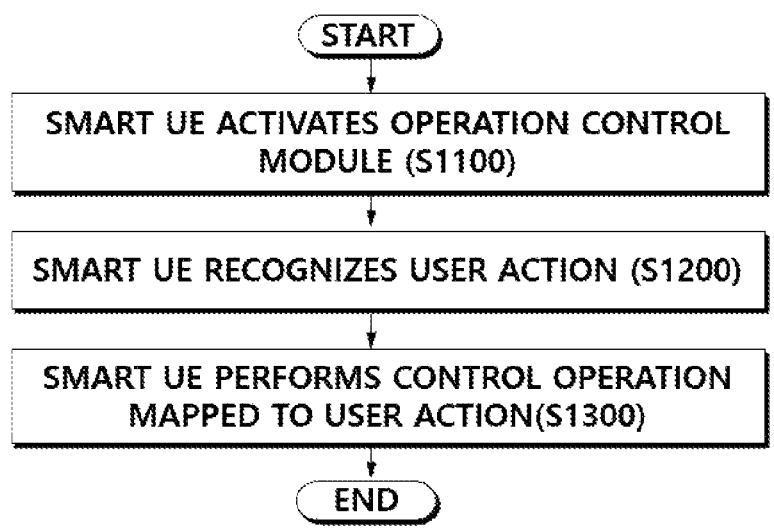
FIG. 3 is a flowchart illustrating a preferred embodiment of a method of controlling an operation of a smart UE according to the present invention.

FIG. 3 is a flowchart illustrating a preferred embodiment of a method of controlling an operation of a smart UE according to the present invention.

Referring to FIG. 3, after an HMD worn on a user's head is connected to a smart UE that plays a video on the HMD, the smart UE activates a motion control module (S1100). The motion control module included in the smart UE recognizes a user action of tapping the HMD by a sensor included in the smart UE, or recognizes the type of a hand motion that the user makes in front of the HMD using a camera (S1200).

The smart UE performs a control operation mapped to the user action (S1300). The smart UE performs the above steps to allow the user to control the smart UE without taking off the HMD, thereby controlling the operation of the smart UE regardless of whether a separate control means is included in the HMD.

In one embodiment, the smart UE of the present invention may perform a control operation based on a user's head motion by sequentially performing the operations of popping up a selection menu for controlling the smart UE on the display of the smart UE, when a user tap action is recognized in step S1200, detecting a user head motion by a sensor of the smart UE, moving a menu selection pointer on the selection menu according to the head motion, and performing an operation indicated in an area in which the menu selection pointer is located, when the user's tap action is recognized.

Figure 4:
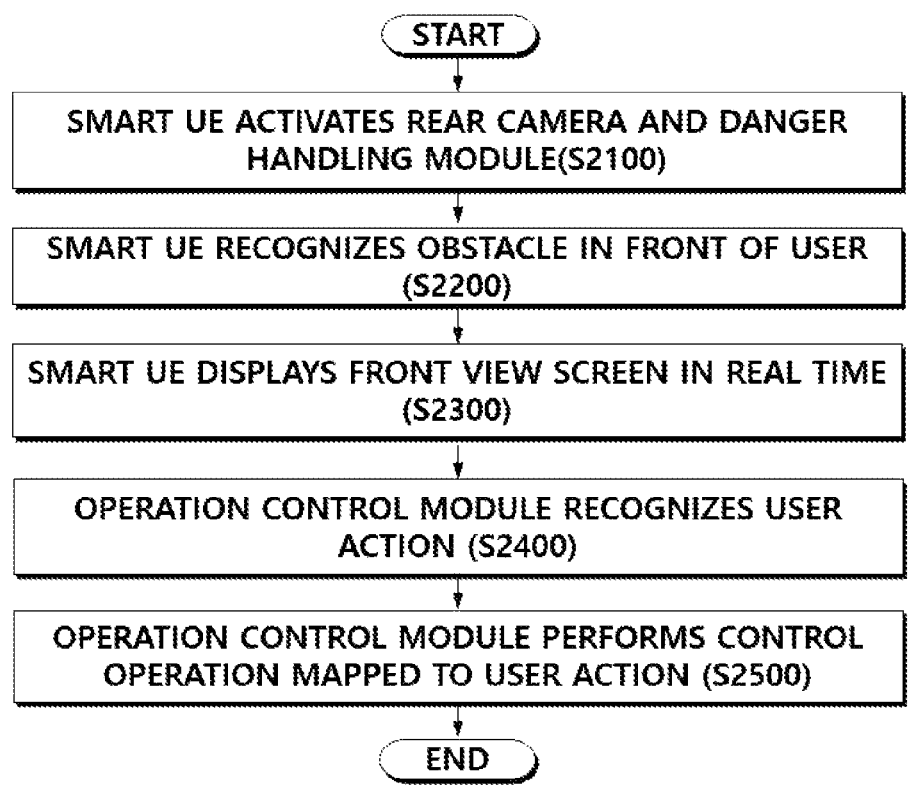
FIG. 4 is a flowchart illustrating a preferred embodiment of a method of controlling a smart UE that recognizes a dangerous situation according to the present invention.

FIG. 4 is a flowchart illustrating a preferred embodiment of a method of controlling a smart UE for recognizing a dangerous situation according to the present invention.

Referring to FIG. 4, a smart UE which plays a video in connection to an HMD worn on a user's head activates a rear camera through which the smart UE may monitor what is in front of the user, and a danger handling module (S2100).

The danger handling module included in the smart UE recognizes an obstacle appearing in front of the user using the rear camera (S2200).

When the danger handling module recognizes an obstacle, a front view screen is displayed in real time on a display unit included in the smart UE (S2300).

When the user recognizes a dangerous situation, the user may take off the HMD. On the contrary, the UE may control the smartphone by the operation control module, while wearing the HMD. That is, when the user takes a preset action, for example, a tap action, the operation control module recognizes the user action (S2400), and performs a control operation mapped to the preset user action (S2500).

As described above, the smart UE of the present invention performs the above steps to allow the user to recognize and respond to the presence of an obstacle in front of the user without taking off the HMD.

The invention claimed is:

1. A smart user equipment (UE) connected to a head mounted display (HMD) worn on a user's head, for playing a video, the smart UE comprising:
an operation control module configured to recognize a predetermined user action by a sensor or a camera included in the smart UE and perform a control operation mapped to the user action,
wherein the smart UE enables the user to control an operation of the smart UE regardless of whether the HMD includes a separate control means by controlling the smart UE without removing the HMD through the operation control module,
wherein while the user is viewing video content including virtual reality, wearing the HMD, the smart UE autonomously detects a dangerous situation through situation awareness and notifies the user of the dangerous situation by an operation of recognizing an obstacle appearing in front of the user by using a rear camera which is installed at the rear of the smart UE and monitors the front of the user, and upon recognition of the obstacle, displaying a front view screen on a display unit included in the smart UE in real time, to enable the user to identify and cope with the dangerous situation without removing the HMD, and wherein when the distance between the user and the obstacle is equal to or less than a threshold, the smart UE discontinues the video play and displays only the front view screen,
wherein the operation control module is configured to perform a control operation by recognizing a user tap action on the HMD by the sensor included in the smart UE, and
wherein the control operation includes at least one of video play, pause, or display of a front view screen of the user.

2. The smart UE according to claim 1, wherein the operation control module comprises:
a menu display module configured to, upon recognition of the user tap action, pop up a selection menu on a display of the smart UE, for controlling the smart UE;
a menu selection module configured to detect a user head motion by the sensor of the smart UE and move a menu selection pointer on the selection menu according to the user head motion; and
an operation selection module configured to, upon recognition of the user tap action, perform an operation displayed in an area in which the menu selection pointer is located.

3. The smart UE according to claim 1, further comprising:
a camera configured to capture a user hand motion in front of the HMD; and
a gesture storage unit configured to store user hand motion types and control operation types mapped to the user hand motion types,
wherein the operation control module recognizes a hand motion made by the user by a camera module and control the smart UE according to a control operation mapped to the hand motion, stored in the gesture storage unit.

4. A method of controlling a smart user equipment (UE) connected to a head mounted display (HMD), the method UE comprising:
(a) activating an operation control module by the smart UE connected to the HMD worn on a user's head and configured to play a video;
(b) recognizing a user tap action on the HMD by using a sensor included in the smart UE or identifying the type of a hand motion made by the user in front of the HMD by using a camera by the operation control module; and
(c) performing a control operation mapped to the user action by the operation control module,
wherein by performing the steps of (a), (b), and (c), the smart UE enables the user to control an operation of the smart UE regardless of whether the HMD includes a separate control means by controlling the smart UE without removing the HMD,
further comprising, while the user is viewing video content including virtual reality, wearing the HMD, autonomously detecting a dangerous situation through situation awareness and notifying the user of the dangerous situation by an operation of recognizing an obstacle appearing in front of the user by using a rear camera which is installed at the rear of the smart UE and monitors the front of the user, and upon recognition of the obstacle, displaying a front view screen on a display unit included in the smart UE in real time, to enable the user to identify and cope with the dangerous situation without removing the HMD, wherein when the distance between the user and the obstacle is equal to or less than a threshold, the smart UE discontinues the video play and displays only the front view screen.

5. The method according to claim 4, wherein the step of (b) comprises:
   upon recognition of the user tap action, popping up a selection menu on a display of the smart UE, for controlling the smart UE;
   detecting a user head motion by the sensor of the smart UE and moving a menu selection pointer on the selection menu according to the user head motion; and
   upon recognition of the user tap action, performing an operation displayed in an area in which the menu selection pointer is located.

6. A smart user equipment (UE) connected to a head mounted display (HMD) worn on a user's head, for playing a video, the smart UE comprising:
   an operation control module configured to recognize a predetermined user action by a sensor or a camera included in the smart UE and perform a control operation mapped to the user action,
   wherein the smart UE enables the user to control an operation of the smart UE regardless of whether the HMD includes a separate control means by controlling the smart UE without removing the HMD through the operation control module,
   wherein while the user is viewing video content including virtual reality, wearing the HMD, the smart UE autonomously detects a dangerous situation through situation awareness and notifies the user of the dangerous situation by an operation of recognizing an obstacle appearing in front of the user by using a rear camera which is installed at the rear of the smart UE and monitors the front of the user, and upon recognition of the obstacle, displaying a front view screen on a display unit included in the smart UE in real time, to enable the user to identify and cope with the dangerous situation without removing the HMD, and
   wherein when the distance between the user and the obstacle is equal to or less than a threshold, the smart UE discontinues the video play and displays only the front view screen,
   wherein the operation control module comprises:
       a menu display module configured to, upon recognition of the user tap action, pop up a selection menu on a display of the smart UE, for controlling the smart UE;
       a menu selection module configured to detect a user head motion by the sensor of the smart UE and move a menu selection pointer on the selection menu according to the user head motion; and
       an operation selection module configured to, upon recognition of the user tap action, perform an operation displayed in an area in which the menu selection pointer is located.

7. The smart UE according to claim 6, further comprising:
   a camera configured to capture a user hand motion in front of the HMD; and
   a gesture storage unit configured to store user hand motion types and control operation types mapped to the user hand motion types,
   wherein the operation control module recognizes a hand motion made by the user by a camera module and control the smart UE according to a control operation mapped to the hand motion, stored in the gesture storage unit.

* * * * *